Dec. 15, 1964  B. L. LARSEN ETAL  3,161,116
CURB MOLDING AND SHAPING APPARATUS
Filed April 22, 1960  5 Sheets-Sheet 1
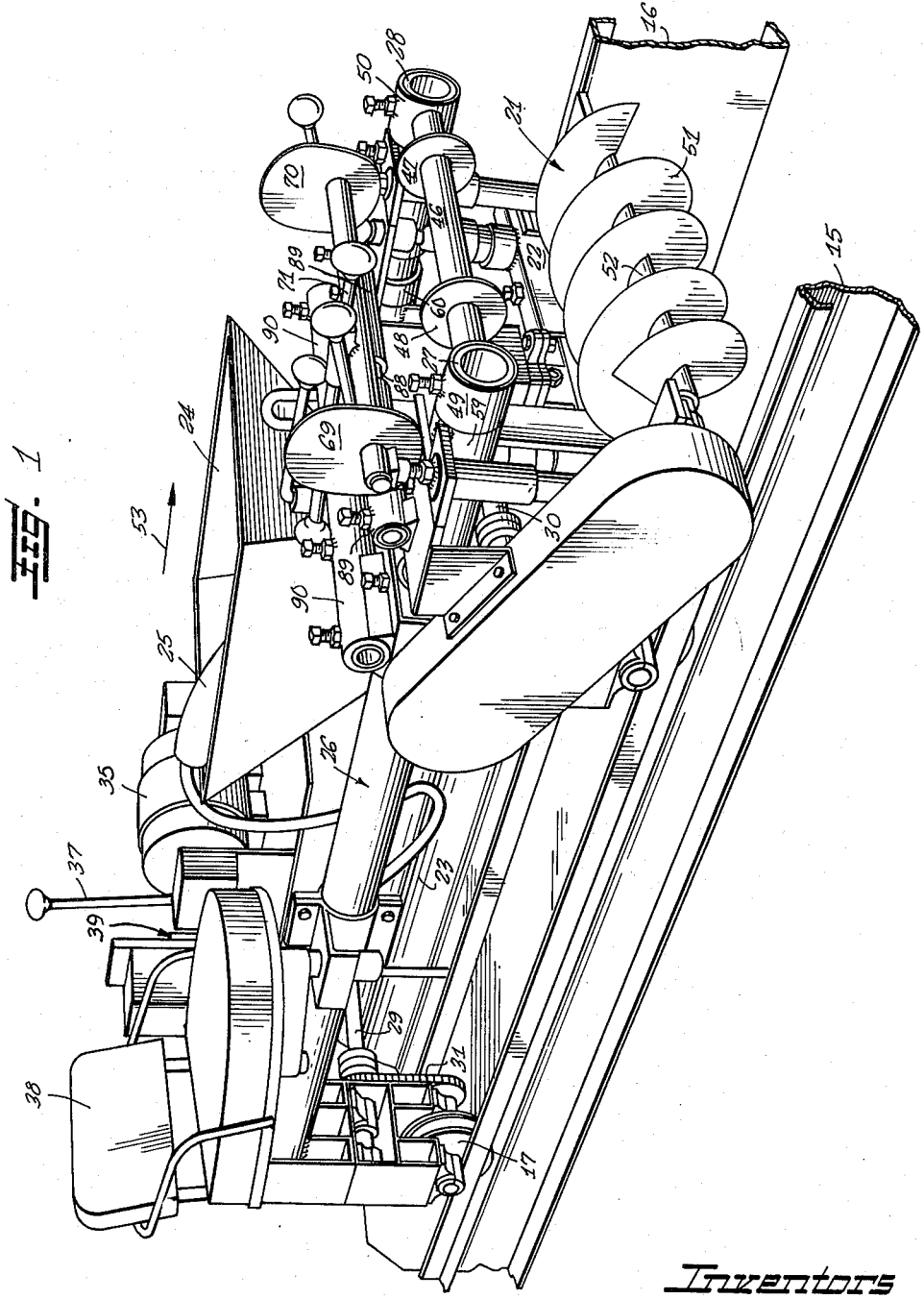
Inventors
Burnham L. Larsen
Bernard J. Larsen
By Hill, Sherman, Meroni, Gross & Simpson
Attys

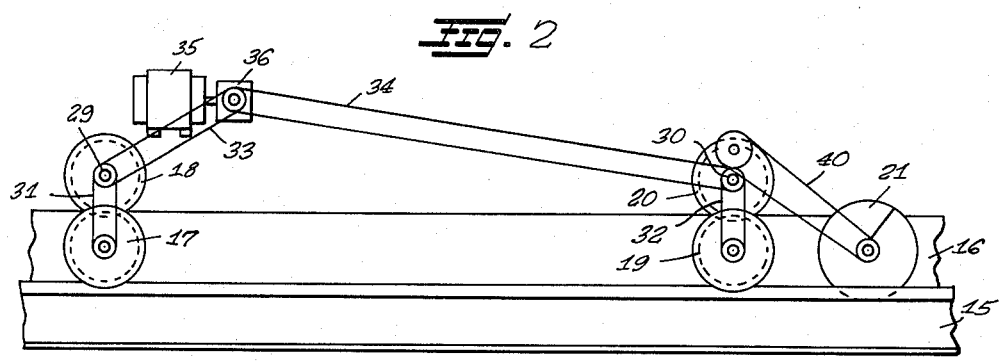
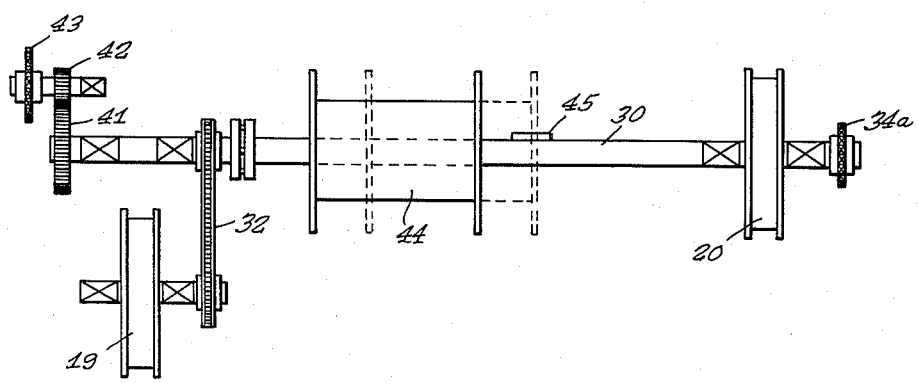
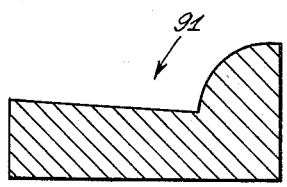
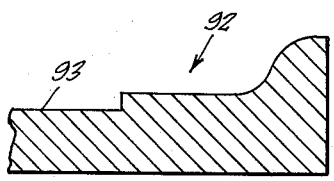

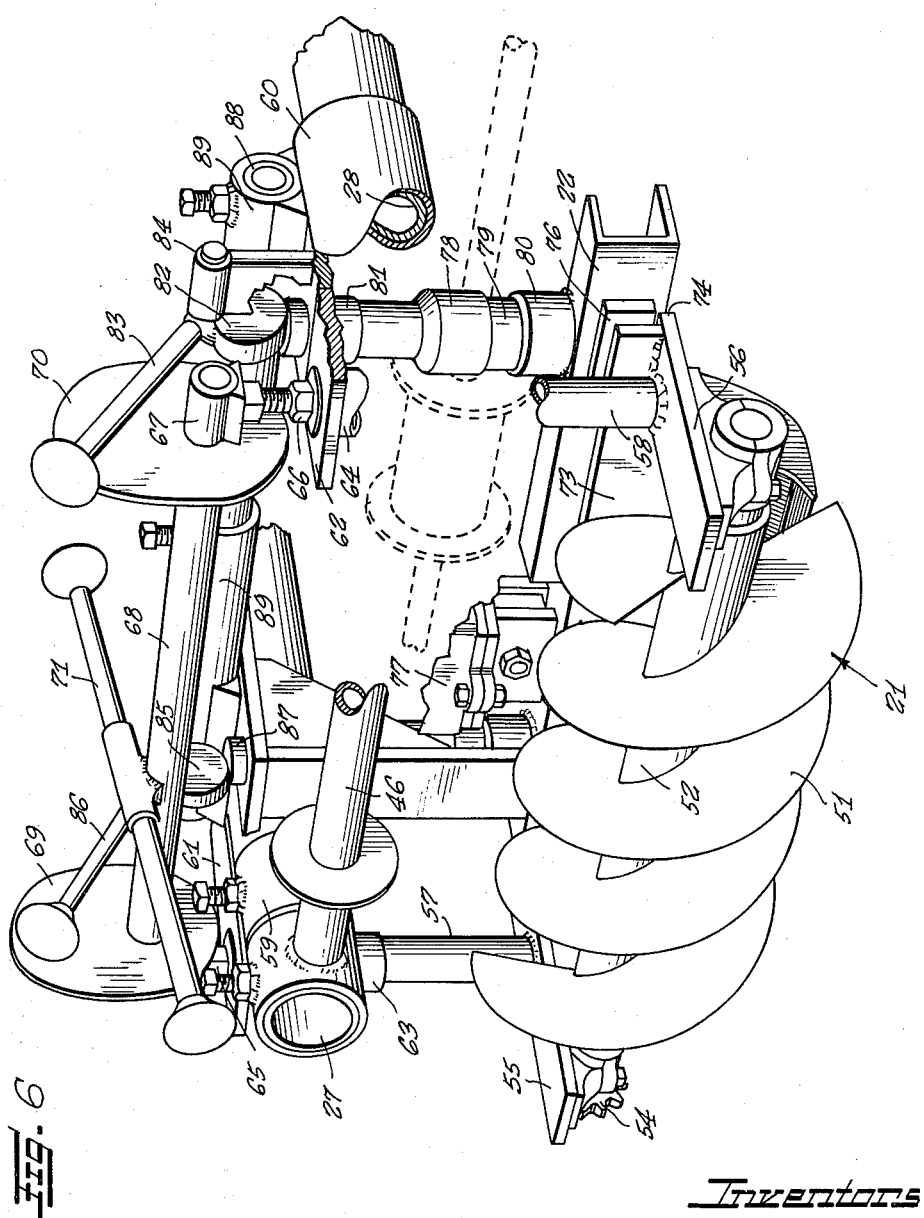

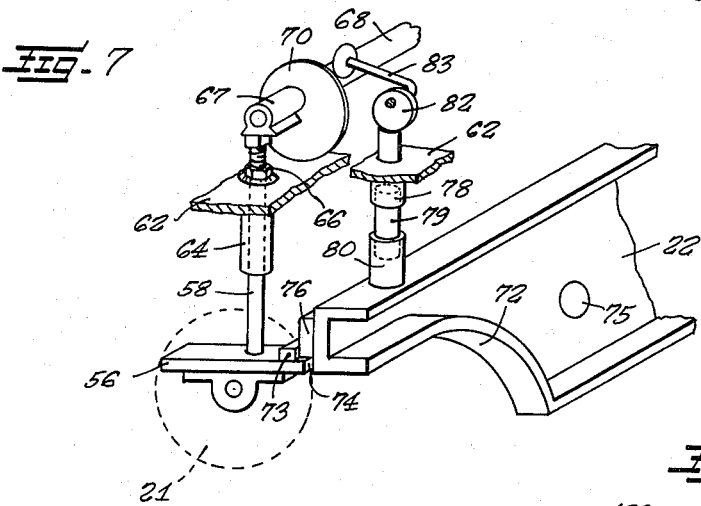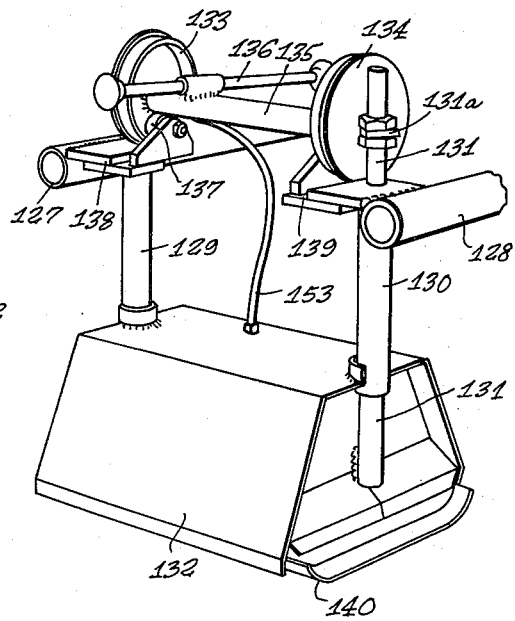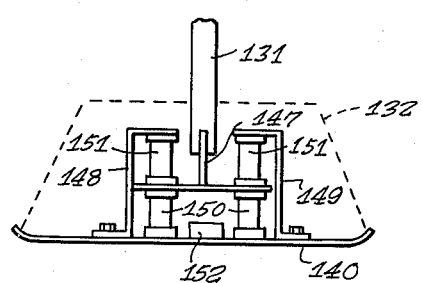

Dec. 15, 1964  B. L. LARSEN ETAL  3,161,116
CURB MOLDING AND SHAPING APPARATUS

Filed April 22, 1960  5 Sheets-Sheet 5

Inventors
Burnham L. Larsen
Bernard J. Larsen

By Hill, Sherman, Meroni, Gross & Simpson  Attys

United States Patent Office 3,161,116
Patented Dec. 15, 1964

3,161,116
CURB MOLDING AND SHAPING APPARATUS
Burnham L. Larsen and Bernard J. Larsen, Cedar Falls, Iowa, assignors, by mesne assignments, to Curbmaster of America, Inc., Cedar Falls, Iowa, a corporation of Iowa
Filed Apr. 22, 1960, Ser. No. 23,961
4 Claims. (Cl. 94—46)

The present invention relates to an improved machine for building concrete curbs and gutters and which can be used for widening and for other related operations.

More particularly the invention pertains to an improved machine designed to completely build curb and gutter, widening and similar constructions in one pass. The machine may be extended to any desired width for curb and gutter widening or be simply adapted to forming full curb and gutter with recessed widening (for asphalt cover) in a single pass.

The invention contemplates providing a machine supported on wheels driven by an electric motor mounted on the machine which is energized by a motor-generator unit on the machine. The machine runs along on forms which provide tracks and excess cement is moved to the position of the curb by an auger driven by the motor and mounted on the front of the machine. A vertically adjustable electrically operated vibrating screed behind the auger strikes off the concrete and vibrates it in a single operation. Behind the screed is a curb mule supplied from a hopper provided with an electrically driven vibrator. The machine is designed to structurally accommodate interchanging the auger and screed with other implements giving it a wider scope of operation.

Accordingly, an object of the present invention is to provide an improved self-driven machine which can form concrete curbs and gutters from poured cement and perform widening operations with a single pass and is capable of continuous substantially automatic operation.

Another object of the invention is to provide an improved auger arrangement for augering excess cement between forms to form a curb and to reduce the amount of cement supplied to the machine from a hopper.

Another object of the invention is to provide an improved vibratory screed and a mounting therefor which permits the screed to be adjustable in height and to be raised clear of the cement by a single motion of a raising lever that also controls the auger.

A still further object of the invention is to provide an improved curb making machine where elements such as a screed and such as a vibrator for the cement supply hopper are operated electrically from power derived from a motor-generator which also operates a motor for driving the machine.

Another object of the invention is to provide an improved arrangement for moving the machine on steep inclines.

A still further object of the invention is to provide an improved machine for forming curb and gutter or widening and wherein the same machine can be utilized for a subgrading operation to run grade after the forms are set but before pouring cement, for providing recessed widening, and for compacting the soil between the forms by vibration.

A still further object of the invention is to provide a machine for forming curb and gutter wherein the machine is simply widened or made more narrow.

Other objects and advantages will become more apparent with the teaching of the principles of the invention in connection with the disclosure of the preferred embodiment thereof in the specification, claims, and drawings in which:

FIGURE 1 is a perspective view of the machine for building curb and gutter in accordance with the principles of the present invention;

FIGURE 2 is a side elevational view shown in schematic form of the drive arrangement for the machine;

FIGURE 3 is a front elevational view showing parts which comprise the drive train for the machine;

FIGURE 4 is a vertical sectional view taken through a curb and gutter of the type capable of being formed by the present machine;

FIGURE 5 is a vertical sectional view taken through a curb and gutter with widening, such as the type which can be formed by the mechanism of the present invention;

FIGURE 6 is a perspective view of the head which attaches to the front end of the machine, with parts broken away, for forming curb and gutter;

FIGURE 7 is another perspective view of portions of the front end of the machine and particularly the screed;

FIGURE 8 is a perspective view of an earth tamping head for the machine;

FIGURE 9 is an end elevational view shown somewhat in schematic form to illustrate a form of vibrating mechanism for the device of FIGURE 8;

FIGURE 10 is an end elevational view shown somewhat in schematic form to show another form of vibrating mechanism for the device of FIGURE 8;

As shown on the drawings:

Figure 11:
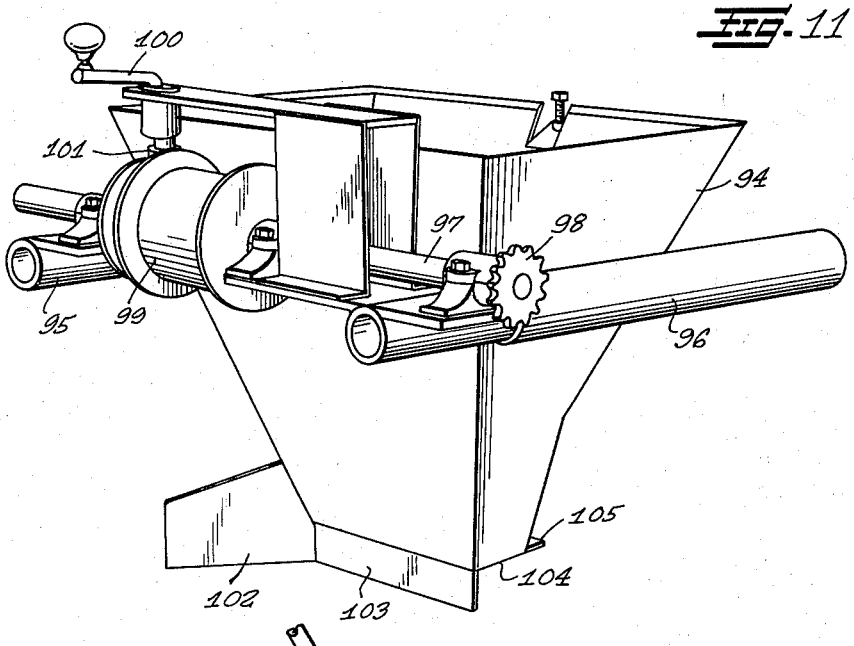
FIGURE 11 is a perspective view of a hopper for the front end of the machine used for a widening operation.

As illustrated in FIGURES 1 and 2, the machine is generally designed for laying curb and gutter between a pair of forms 15 and 16 which provide rails on which the machine is run. The machine has rear wheels 17 and 18 and forward wheels 19 and 20 with the wheels 17 and 19 supported on the form or rail 15 and wheels 18 and 20 supported on a form or rail 16.

The machine travels along the rails and in front of the machine is a rotatable auger 21 which engages excess concrete dumped between the rails 15 and 16 and moves it over to the side where the curb is formed to thereby reduce the amount of cement which needs to be supplied to the curb through a hopper 24.

Behind the auger 21 is a vibrating screed 22 which strikes off the concrete and vibrates it in one operation. Behind the screed is a curb molding form or "mule" 23 which is rigid on the machine and which is supplied cement from the hopper 24. Within the hopper is a vibrator 25 controlling the flow of cement. The term "mule" is used to designate the shaped forming element, which will be described in greater detail, as a term which is convenient for the element 23 which is not capable of full description in a single term.

As shown in FIGURE 1, the machine includes a frame 26 having a pair of tubular longitudinally extending frame members 27 and 28 which are particularly provided for supporting the elements at the front end of the machine and in order that these elements may be removed for placing a new head on the machine.

The drive arrangement for the machine, as illustrated in FIGURES 1, 2 and 3, includes rear and forward cross power shafts 29 and 30. The rear shaft supports the wheel 18 and is suitably driven such as by a chain 33, and a chain 31 is driven by the shaft 29 to drive the wheel 17. Suitable sprockets are provided for the chains.

The cross shaft 30 at the front end of the machine supports the wheel 20 and drives a chain 32 to drive the other wheel 19. The shaft is driven by a chain 34.

The chains 33 and 34 to drive the wheels are driven by an electric motor 35 connected to a speed reducing unit 36 which connects directly to the chains 33 and 34. The mechanism is controlled by a lever 37, FIGURE 1, handled by an operator who sits on a seat 38 on the frame.

The motor 35 receives electrical power from a motor-generator shown generally at 39 mounted on the rear of the machine which also provides electrical energy for vibrating the screed 22 and for operating the vibrator 25 for the cement hopper.

At the front end of the machine, the power cross shaft 30 is driven by a sprocket 34a which is driven by the chain 34, FIGURE 3. The shaft carries a gear 41, driving a gear 42 which drives a sprocket 43 carrying a chain 40, FIGURE 2, for driving the auger at the front of the machine.

Also mounted on the cross shaft 30 is a winch drum 44 which normally may idle on the shaft but which can be shifted axially over a dog 45 so that the drum will be driven. The drum can carry a cable which may be secured to an anchor at the top of an incline for steep inclines wherein the wheels will slip on the track. The cable is normally wound so as to be payed off the drum from the bottom and a guide rod 46, FIGURE 1, is provided to keep the cable above the auger 21. The rod has side flanges 47 and 48, and is removably mounted on the ends of the frame tubes 27 and 28 by sleeves 49 and 50.

The auger 21 preferably embodies a dual flight 51 and the ends of the auger shaft 52 are supported in bearings on the frame. The concrete dumped in front of the machine is augered to the left hand side of the machine (in the direction of machine movement as shown by the arrow 53).

The head which incorporates the auger 21 and the screed 22 is shown in detail in FIGURES 6 and 7. The auger shaft 52 is supported at its ends in bearings supported on bearing brackets 55 and 56 and the shaft is driven by a sprocket 54. The bearing brackets are supported on vertical rods 57 and 58 which can be raised to lift the auger.

The entire head is supported on sleeves 59 and 60 slid over the tubes 27 and 28 of the frame and locked thereon. For supporting and for lifting the auger, plates 61 and 62 are secured to the sleeves 59 and 60 on the housing and have guide housings 63 and 64 for the rods 57 and 58. The operating height of the auger is controlled by height adjusting nuts 65 and 66 turned onto the rods 57 and 58 which are threaded at their upper ends. The nuts 65 and 66 rest against the upper ends of the guides 63 and 64 supporting the auger.

For raising the auger, the upper ends of the auger lift rods 57 and 58 are secured to bearing sleeves such as 67 journalled on the ends of a main lift shaft 68. The lift shaft 68 has auger lift cams 69 and 70 at its ends and when the shaft is turned by a lift arm 71 which is slidably connected to the shaft 68, the cams 69 and 70 will bear down on the plates 61 and 62 to raise the lift rods 57 and 58 and thereby lift the auger to a non-operating position.

The head also supports the screed 22 which has a shaped end 72 to conform to the shape of the curb to be formed. An auger frame plate 73 extends across the machine attached to the auger brackets 55 and 56. On the screed 22 are rubber mounts such as 75 which push against the plate 73.

The plate 73 is secured to the brackets 55 and 56 which have rearwardly projecting ends 74 which when lifted engage projections 76 attached to the screed 22 to raise the screed when the auger is lifted.

The screed is vibrated by an electrical vibrator 77 which is suitably bolted to the screed. Electrical energy for the vibrator is received from the generator 39.

The operating height of the screed can be controlled. At the top of the screed ends are sockets such as 80, FIGURES 6 and 7, which receive the rubber cylinder 79.

This cylinder limits the vibration being transmitted from the screed to the machine. The upper end of the rubber cylinder 79 is received in a rod 78 having a socket shaped end, with the upper end of the rod slidably received in a guide 81 on the plate 62. The upper end of the rod bears against a screed height adjustment cam 82 which is pivotally supported on a bracket 84 mounted on the plate 62, and which is adjustably positioned by a handle 83 for adjusting the screed height. At the other end of the screed a similar handle 86 operates a cam 85 bearing against the upper end of a screed adjustment rod 87. The handles are independently operable to control their respective ends of the screed.

Behind the screed is the shape elongated mold member or mule 23 formed of sheet metal and having the desired shape of the curb. An opening, not shown, is provided in the top of the curb section of the mule in order that the hopper 24 may supply the additional cement needed which is not received from the front of the machine. The curb and gutter mule smooths and trowels the cement as the machine moves forwardly.

The machine has a reverse direction for backing up and for re-doing any portion that was not built completely satisfactorily due to the wrong consistency of the cement or for other reasons. When reversing directions, the entire screed and auger assembly is easily raised from the concrete to eliminate dragging cement back with the machine.

The only vibration used in actually building the curb is the vibration of the cement which has been placed in the hopper. The screed strikes off the cement ahead of the mule and its vibration is isolated from the machine for longer wear of the machine and improved performance.

The design of the machine readily accommodates widening or narrowing for different widths of curb and gutter or for use as a widening machine to place extra cement along an old road to give added width. This is simply accomplished by shifting outwardly or inwardly the longitudinal tubes 27 and 28 at the side of the machine. For this purpose cross frame rods such as 88, FIGURES 1 and 6, are provided to extend into sleeves such as 89 for the rod 88, or 90 for another rod behind it and the sleeves are provided with releasable set screws so that the sides of the machine can be shifted laterally. The cross power shafts are provided with extensions to accommodate lateral adjustment and additions are provided for the pan on the mule 23. Extensions are also provided for the auger and the screed which may be simply bolted thereto.

FIGURE 4 illustrates a curb and gutter 91 of the type which is poured and formed by the machine of FIGURES 1, 6 and 7. FIGURE 5 illustrates at 92 a curb and gutter having recessed widening 93. For pouring the curb and gutter with recessed widening of FIGURE 5, the head of FIGURE 6 is removed and the head of FIGURE 11 is used.

The head for the recessed widening includes a hopper 94 supported between sleeves 95 and 96 which are slid over the tubes 27 and 28 on the frame of the machine. Ahead of the hopper is mounted a winch shaft 97 driven by a sprocket 98 with a winch drum 99 thereon. The winch drum can be shifted into locked position by a handle 100 having a cam 101 at its lower end for shifting the drum 99 laterally along the shaft 97.

Ahead of the lower opening 104 of the hopper is a laterally and a forwardly extending angle side plate 102 for striking off widening, which has already been poured, to the correct grade so that the lip or amount of drop from the gutter line to the widening is maintained at an exact distance. This angle side plate 102 also keeps excess cement that might flow out ahead of the hopper from running onto the piece that has already been poured.

Extending downwardly in front of the hopper opening 104 is a plate 103 that serves to keep excess cement from running out ahead of the machine since all concrete that is poured through the front hopper 94 should be funneled toward the rear of the machine where the gutter mule will trowel. The height of the gutter is determined by the height of the opening 104 at the bottom of the hopper 94 and a small rearwardly extending horizontal plate 105 is mounted behind the opening 104.

The hopper 24 operates in the same manner supplying additional concrete to the curb that is formed beneath the curb mule 23.

Figure 12:
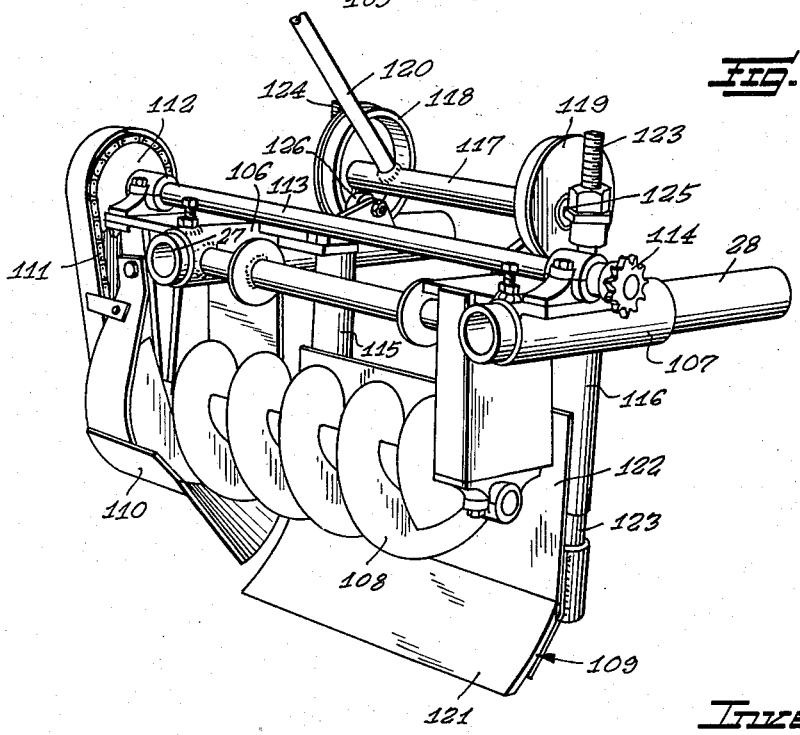
FIGURE 12 is a perspective view of a head for the front end of the machine used for sub-grading.

The heads of FIGURES 6 and 11 may be removed and replaced with the head of FIGURE 12 for running grade between forms. The head of FIGURE 12 is provided with sleeves 106 and 107 which slide over the tubular frame members 27 and 28 and are locked thereto by set screws. The head is provided with a blade assembly 109 for grading the earth between the form and the dirt which is dug loose is augered outwardly by an auger 108 into a chute 110. The auger is driven in rotation by a chain 111 driven by a sprocket 112 on a shaft 113 that is driven by a sprocket 114 and is mounted on the head.

The blade assembly 109 includes a lower curved blade 121 and a back plate 122. The curved blade is carried at the lower ends of vertical lift rods 123 and 124. The rods are bolted at their upper ends to a shaft 125 carrying a sleeve 117 and at the ends of the sleeve are cams 118 and 119. The sleeve and the cams are rotated by a handle 120. The cams have a cam flange which is guided with respect to the head and follower rollers such as 126 project inside of the flange, and a suitable surface is provided outside of the flange. Thus with rotation of the cams, the rods 123 which are supported in vertical guide housings 115 and 116, are moved up and down to adjust the height of the blade 121.

A vibrating compactor head illustrated in FIGURES 8, 9 and 10 may also be placed on the front of the machine in place of the previously described heads. The vibrating compacting head is provided with sleeves 127 and 128 which slide over the frame tubes 27 and 28 and are locked thereto. The compactor is shown somewhat schematically in FIGURES 9 and 10 to illustrate the resilient suspension therefor. The compactor is supported on side rods 131 which are vertically slidable in housing tubes 129 and 130 for adjustment of the height. The upper ends of the rods 131 are secured at the ends of a shaft 131a which is fitted with a rotatable sleeve carrying at its ends cams 133 and 134. The cams and the sleeve 135 are rotatable by a handle 136 and each of the cams is provided with a flange to rest on portions of plates 138 and 139 and to receive rollers such as 137 to hold the cams from vertical movement. The rotational position of the cams thereby establishes the height of the compacting plate 140 which is mounted at the base of the rods 131.

The plate 140 is mounted for movement within a housing 132 which is directly secured to the guides 129 and 130.

As shown in FIGURE 9, the plate 140 is mounted for vibration by rubber mounts 143 and 144 which are positioned between an arm 142 on the rod 131 and brackets 145 and 146 which are secured to the plate. A vibrator 152 is mounted directly on the center of the plate 140 and is supplied with electricity through an electrical cable 153.

FIGURE 10 illustrates another form of mounting the plate 140 and vertical rubber mounts 150 and 151 are mounted below and above a T-shaped arm 147 secured to the rod 131. The other ends of the rubber mounts 150 and 151 are respectively attached to the plate 140 and to the upper ends of brackets 148 and 149 mounted on the base plate.

In operation, as illustrated in FIGURE 1, the operator in the seat 38 drives the machine forwardly with the auger 21 moving cement laterally to be formed by the curb. The vibrating screed levels and compacts the cement and the cement is smoothed by a curb mule 23 which is supplied with additional cement from a hopper 24 through which the cement is fed with the aid of a vibrator 25. If the machine is to be used for widening, the head shown in FIGURE 6 is replaced by the head of FIGURE 11. This head can be replaced by the head of FIGURE 12 for grading between forms, or the head can be replaced by the head of FIGURE 8 for compacting.

Thus it will be seen that we have provided an improved machine for making curb and gutter and for the other purposes outlined, which meets the objectives and advantages above set forth.

The curb is preferably formed on the left hand side of the machine, in the direction in which it is travelling, so that when cement is supplied from a ready mix concrete truck, the driver has full vision of the machine from the driver's side to enable him to control the location and speed of his truck and keep the discharge chute of the truck above the hopper.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

We claim as our invention:

1. In a curb molding and shaping machine the combination comprising,
 a frame supported on wheels,
 a shaped mold member carried on the frame for forming a cement curb,
 a screed extending across in front of the mold member and having a shaped cut out portion in registry with the mold member and carrying a vibrator thereon,
 vertical support rods carrying the screed on the frame,
  said screed and vertical rods being vertically movable between a lowered operating position at the elevation of the mold member and an elevated non-operating position above the mold member,
 a raising means comprising an adjustable lever means connected to said vertical rods and engageable cooperating flanges on said vertical rods and said screed for instantaneous full lowering and raising of the screed and movable from a first position wherein the screed is in said lowered position to a second position wherein said screed is in said elevated non-operating position with said screed movable independent of the mold member,
 and independent vertical adjustment means separate from said lever means and having a movement independent thereof effecting fine vertical adjustment of the screed in small vertical movements.

2. A curb molding machine in accordance with claim 1 wherein said adjustable lever means is attached to a rotary eccentric cam engageable with a fixed surface on the frame for elevating the screed.

3. A curb molding machine in accordance with claim 2 wherein the fine adjustment means is positioned between said fixed surface and said screed for adjustably limiting the elevated position of the screed relative to the mold member in operating position.

4. In a curb molding and shaping machine the combination comprising,
 a frame,
 wheels mounted on said frame and adapted to engage a guiding track for moving said frame along a path,
 a motor generator unit on the frame,
 an electrically operated driving motor on said frame connected to drive the wheels and connected to the generator,
 a mule mounted on said frame,
 a pair of horizontally extending support tubes connected in fixed assembly to said frame,
  each of said tubes having a distal end projecting forwardly beyond said wheels, means defining a pair of mounting plates detachably connected respectively to the distal end of each of said tubes and having first and second apertures formed therein, means defining a pair of vertically extending auger rods, each of said auger rods having an upper and lower end with said upper ends projecting upwardly respectively through said first apertures, first journal means mounted on said upper end of said rods, a main lift shaft interconnecting said first journal means and rotatably carried thereby, means to rotate said lift shaft, first cam means mounted on said main lift shaft and operatively engageable with said plates for raising and lowering said lift shaft and said rods, a laterally extending auger for moving cement laterally in position to be shaped into a curb attached to the lower ends of said rods, means defining a pair of vertically extending resiliently extensible screed rods, each of said screed rods having an upper and a lower end with said upper ends projecting upwardly respectively through said second apertures, a pair of second journal means mounted respectively on said plates above said screed rods, second cam means mounted on said second journal means and operatively engageable with the upper ends of said screed rods for limiting the elevation of said screed rods, and a vibratory screed attached to the lower ends of said screed rods.

References Cited by the Examiner
UNITED STATES PATENTS

| | | | |
|---|---|---|---|
| 2,006,316 | 6/35 | Mandt | 94—44 |
| 2,204,021 | 6/40 | Leatherman | 94—46 |
| 2,225,015 | 12/40 | Lebelle | 94—46 |
| 2,396,426 | 3/46 | Jackson | 94—44 |
| 2,587,321 | 2/52 | Hohnke | 94—46 |
| 2,623,446 | 12/52 | Clark et al. | 94—46 |
| 2,664,794 | 1/54 | Evans | 94—46 |
| 2,847,916 | 8/58 | Andrus | 94—46 |
| 2,864,290 | 12/58 | Freeman | 94—46 |
| 3,015,258 | 1/62 | Apel | 94—46 |
| 3,130,654 | 4/64 | Apel | 94—46 |

BENJAMIN BENDETT, *Primary Examiner.*
JACOB L. NACKENOFF, *Examiner.*